Patented Apr. 15, 1947

2,418,944

UNITED STATES PATENT OFFICE 2,418,944

GUANIDES AND THEIR PREPARATION

Donald W. Kaiser and Jack T. Thurston, Riverside, Conn., assignors to American Cyanamid Company, New York, N. Y., a corporation of Maine No Drawing. Application December 19, 1942, Serial No. 469,580

3 Claims. (Cl. 260—249.5)

This invention relates to a new method of preparing aliphatic, alicyclic and aromatic substituted guanides.

In our co-pending application Ser. No. 463,666 now Patent No. 2,397,667, filed October 28, 1942, we disclosed the preparation of aliphatic, alicyclic and aromatic acyl-guanylureas as new compounds. We have now discovered that these acyl-guanylureas can be converted into aliphatic, alicyclic and aromatic substituted guanides with good yields and a high degree of purity by a relatively simple process as will be fully described hereinafter.

The acyl guanylureas of our said application are prepared by treating an acyl dicyandiamide with a slight molecular excess of an acid having a dissociation constant of at least $1 \times 10^{-4}$ at temperatures from about room temperature to 100° C. or more. The acyl guanylureas, with the exceptions of the lower aliphatic acyl guanylureas, may be recovered from the reaction mixture either in the form of their acid salt or as the free base. The acyl dicyandiamides from which these products are prepared are also new but may be obtained by simply mixing at a temperature not in excess of about 60° C. dicyanidiamide with a desired acylating agent such as an acyl halide or acyl anhydride of an aliphatic, alicyclic, or aromatic carboxylic acid and a water-soluble alkali metal hydroxide in the presence of a minimum amount of water. Preparation of a representative acyl guanylurea from known starting materials will be described in one of the specific examples hereinafter.

The aliphatic, alicyclic and aromatic acyl-guanylureas which may be employed to prepare substituted guanides by our new process are those described in our above-named application and have the general formula

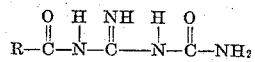

or an isomeric form thereof, in which R is an aliphatic, alicyclic or aromatic radical. The aliphatic, alicyclic and aromatic substituted guanides which may be prepared by the process of the present invention may be represented by the general formula

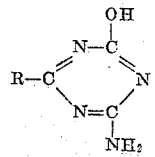

or an isomeric form thereof, in which R is as indicated above.

It will be seen from the above formulae that the conversion of substituted acyl-guanylureas to substituted guanides involves the elimination of a molecule of water from the acyl-guanylurea, cyclization of the residue and other important changes in the guanylurea nucleus. Although the triazine ring structure given above for the substituted guanides is thought to be correct the chemical behaviour of these compounds indicates that they may also exist in several tautomeric forms under different conditions. Accordingly, while guanides possessing the triazine ring structure indicated above may be called 2-R-4-hydroxy-6-amino-1,3,5-triazines this latter nomenclature designates only one of their possible tautomeric forms. For this reason the compounds as a class are more accurately known as aliphatic, alicyclic and aromatic substituted guanides.

The process of the present invention for the preparation of substituted guanides consists essentially of the steps of dissolving a desired aliphatic, alicyclic or aromatic acyl-guanylurea in a solvent with an alkaline material, allowing the conversion of the guanlyurea to a guanide to continue until the desired state of conversion has been reached and then causing the separation of the resulting aliphatic, alicyclic or aromatic guanide by treatment with an acid.

The part played by the alkaline substance in the reaction has not been definitely established as yet but we believe that the conversion of substituted acyl-guanylureas to substituted guanides involves the formation of an acyl-guanylurea salt as a preliminary step. Accordingly, any alkaline material capable of forming a salt with aliphatic, alicyclic or aromatic acyl-guanylureas may be employed in our new process to yield substituted guanides. As shown in the specific examples which follow we have used many different types and kinds of alkaline materials to convert acyl-guanylureas to substituted guanides. In general, any alkaline material having a dissociation constant of about $1 \times 10^{-6}$ and which is sufficiently soluble in an acyl-guanylurea solvent so that it is able to form a salt with the acyl-guanylurea may be successfully employed. Among such alkaline materials may be specifically mentioned sodium hydroxide, sodium carbonate, sodium bicarbonate, potassium hydroxide, potassium carbonate, potassium bicarbonate, strontium hydroxide, calcium hydroxide, ammonium hydroxide, monoethanolamine, sodium ethylate, sodium butylate, secondary butylamine, diethylamine, benzylamine, diethylamine, diisoamylamine, dimethylamine, dipropylamine, ethylenediamine, isoamylamine, methylamine, piperidine, tetramethylenediamine, triethylamine, trimethylenediamine, morpholine and many other organic and inorganic alkaline materials. The amount of alkaline substance employed should preferably be enough to dissolve the acyl-guanylurea. Ordinarily, we employ approximately equimolecular proportions of the acyl-guanylurea and the alkali although an excess of alkali will do no harm.

Since the substituted acyl-guanylureas are crystalline solids and most alkalis suitable for our process are also solids it is desirable that the two be dissolved in a mutual solvent. In most cases water is entirely satisfactory, although with some acyl-guanylureas and some alkalis the water may advantageously be substituted in whole or in part with an organic solvent such as alcohol, Cellosolve, dioxane, pyridine, or the like. As previously indicated, the alkaline material must be present in soluble form to such an extent that it will form a salt with the acyl-guanylurea. Accordingly, the choice of solvent will also depend to some extent upon the alkaline material selected for use in the reaction.

The time and temperature of the reaction may vary considerably. With most alkaline materials the reaction is substantially complete in 2 or 3 minutes when the reaction mixture is heated at refluxing temperatures. At extremely low temperatures, i. e. about 0° C., the reaction may require as long as 5 hours. However, since the speed of the reaction will also depend upon the strength and concentration of the alkali employed the time of reaction at a stated temperature may vary within wide limits. Ordinarily no harm is done if the reaction period is extended at any given temperature, the only exception being when employing strong alkalis, such as sodium hydroxide, at very high temperatures in which case ammonia may be split off from the guanide. Since the evolution of ammonia is easily detected this decomposition can be easily avoided.

In most cases the conversion of the aliphatic, alicyclic or aromatic acyl-guanylureas to the corresponding aliphatic, alicyclic or aromatic substituted guanides takes place within a few minutes after the acyl-guanylurea has dissolved in the alkaline solution. Ordinarily the substituted guanide product is soluble in the alkaline solution and remains dissolved therein although, as will be noted from the specific examples, the guanide, probably in the form of a salt, may precipitate from the reaction mixture. To recover the substituted guanide in its free state it is merely necessary that the solution containing the reaction product be acidified with a mild or strong organic or inorganic acid. The free guanide being insoluble in the reaction solvent is precipitated upon neutralization of the reaction mixture and may be recovered by filtration or decantation and may be further purified by washing with water and/or recrystallization from water or organic solvents. Recovery and purification of the product is fully disclosed in the specific examples.

Among the various aliphatic, alicyclic and aromatic acyl-guanylureas which may be successfully converted to the corresponding aliphatic, alicyclic or aromatic substituted guanides may be specifically mentioned: butyryl-guanylurea, caproyl-guanylurea, lauryl-guanylurea, stearyl-guanylurea, palmityl-guanylurea, α-bromcaproyl-guanylurea, 9,10-dichlorstearyl-guanylurea, γ-nitrovaleryl-guanylurea, β-N-acetylbutylamino-propionyl-guanylurea, ω-hydroxydecanoyl-guanylurea, ω-carboxyvaleryl-guanylurea, adipyl-guanylurea, sebacyl-guanylurea, succinyl-guanylurea, phthaloyl-guanylurea, hexahydrophthaloyl-guanylurea, benzoyl-guanylurea, p-aminobenzoyl-guanylurea, p-nitrobenzoyl-guanylurea, o-nitrobenzoyl-guanylurea, o-carboxybenzoyl-guanylurea, p-hydroxybenzoyl-guanylurea, m-hydroxyphenoxyacetyl-guanylurea, α-naphthoyl-guanylurea, β-5-sulfonaphthoyl-guanylurea, naphthenoyl-guanylurea, cyclohexylacetyl-guanylurea, hexahydrobenzoyl-guanylurea, cyclopentylacetyl-guanylurea, ω-carboxypelargonyl-guanylurea, and others falling within the scope of our previously mentioned co-pending application.

Many of the aliphatic, alicyclic and aromatic guanides prepared in accordance with the herein described process are new compounds. In general, in their purified state, they are white crystalline powders exhibiting both plate-like and needle-like crystals. Those containing nitro groups may be slightly yellowish in color. They are characterized further by having a high decomposition point, most of them decomposing without melting. They are easily soluble in alkalis of moderate strength, are fairly soluble in acids and are slightly soluble in water. They are soluble in organic solvents such as the ethyl ether of ethylene glycol, alcohol, dioxane, pyridine, etc., and those having moderately long alkyl chains are very slightly soluble in benzene. They are practically insoluble in ether and mineral spirits. These compounds are of value as intermediates in the preparation of dye-stuffs and resins.

Our invention will now be illustrated in greater detail by means of the following specific examples in which the preparation of typical substituted guanides is described. All parts are by weight unless otherwise noted. It should be understood that our new process is not to be limited to these particular examples or the particular conditions employed therein, since as stated above, the process is susceptible to many changes, and the invention is to be construed as broadly as the appended claims permit.

EXAMPLE 1

*Benzoguanide*

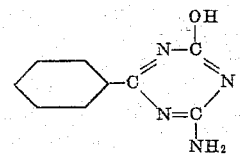

63.5 g. of 95% sodium hydroxide dissolved in 125 cc. of water were placed in a three-necked flask provided with a stirrer, dropping funnel, and thermometer. 63 g. of pulverized dicyandiamide was added to the sodium hydroxide solution with stirring until dissolved. 150 cc. of acetone was then added. The resulting double layer was agitated thoroughly and the temperature kept between 20°–25° C. while 70.25 g. of benzoyl chloride was added in the course of ½ hour. During this time a solid separated but addition of water after the reaction was complete gave a clear, very light yellow solution. Acidification of the solution with acetic acid precipitated a colorless solid which was filtered, washed well with water and allowed to air dry. The product, benzoyl dicyandiamide, was recovered with a yield of 71.5%.

188 parts by weight (1.0 mol) of benzoyl-dicyandiamide, 400 parts by weight of water and 120 parts by weight (1.2 mols) of concentrated hydrochloric acid were mixed in a reaction vessel fitted with a refluxing condenser and heated to refluxing temperature. Complete solution of the reaction mixture occurred but within 5 minutes so much solid reaction product (benzoylguanylurea hydrochloride) had deposited that 500 parts by weight of water was added. The heating was continued for a short time, the mixture was then cooled and made alkaline with ammonia. The resulting solid cake of benzoylguanylurea was broken up and filtered, washed with water and dried in an oven at 90° C. On recrystallization from butanol colorless plate-like crystals were obtained which decomposed at 187–188° C. and gave a pink-violet guanylurea test with CuSO₄ and NaOH. Chemical analysis of the material checked well with the theoretical values for benzoylguanylurea.

A mixture of 10.3 parts by weight of benzoylguanylurea in 35 parts by weight of water and 23 parts by weight of 50% NaOH was heated to boiling under a reflux condenser. The benzoylguanylurea completely dissolved and heating was continued for one-half hour at refluxing temperature. The reaction mixture was then cooled and the colorless solution acidified with acetic acid. The colorless solid which precipitated was filtered, washed with water and allowed to dry. The reaction product, benzoguanide, decomposed at 325° C. when heated. The yield was 99% of the theoretical.

EXAMPLE 2

*Benzoguanide*

A mixture of consisting of 20.6 parts by weight of benzoyl-guanylurea, 3.0 parts by weight of monoethanolamine, 150 parts by weight of water, and 140 parts by weight of Cellosolve was heated to reflux. Complete solution occurred. After filtration from a small quantity of dirt, the filtrate was poured onto ice and acidified with acetic acid. The colorless solid was filtered, washed with water and air dried. The yield of benzoguanide was 12.2 parts by weight or 65% of the theoretical. The product decomposed when heated to 320 to 321° C.

EXAMPLE 3

*Benzoguanide*

A suspension of 20.6 parts by weight of benzoyl-guanylurea in a mixture of 90 parts by weight of concentrated ammonium hydroxide, 50 parts by weight of water, and 47 parts by weight of Cellosolve was heated to reflux. Complete solution did not occur until 186 parts by weight more of Cellosolve was added. The hot solution was filtered and diluted with a large volume of water. A colorless solid which was later identified as unreacted benzoyl-guanylurea precipitated from solution and was removed by filtration. The filtrate was then acidified with acid whereupon colorless crystals of benzoguanide were precipitated. The product decomposed when heated at 321–323° C. and upon fusion with a known sample of benzoguanide gave no depression of the decomposition temperature.

EXAMPLE 4

*Benzoguanide*

Refluxing of 20.6 parts by weight of benzoyl-guanylurea, 12 parts by weight of potassium bicarbonate, 250 parts by weight of water, and 47 parts by weight of Cellosolve was continued until a clear solution resulted. Carbon dioxide was slowly evolved during the reaction. On cooling the hot solution a large quantity of the potassium salt of benzoguanide separated from solution. The mixture was diluted with additional water and then made acid with acetic acid. The contents of the flask set to a nearly solid cake. The solid was filtered, washed thoroughly with water, and allowed to dry. Decomposition occurred at 320–322° C. and the yield of benzoguanide was 18.4 parts by weight or 98% of the theoretical.

EXAMPLE 5

*Benzoguanide*

To 119 parts by weight of n-butanol was added 1.15 parts by weight of sodium. After solution was complete, 10.3 parts by weight of benzoylguanylurea was added and the mixture heated to reflux. Before reflux occurred a clear, very pale yellow solution resulted. The solution was refluxed for 10 minutes, filtered from a little dirt, and excess glacial acetic acid added. The resulting finely divided colorless solid was filtered, washed with acetone to remove butanol and then thoroughly washed with water. After drying in an oven at 110° C., 8.2 parts by weight or an 87.5% yield of benzoguanide was obtained which decomposed on heating at 323° C.

EXAMPLE 6

*Benzoguanide*

The contents of a flask containing 10.3 parts by weight of benzoyl-guanylurea, 1.35 parts by weight of calcium hydroxide, 300 parts by weight of water, and 93 parts by weight of Cellosolve was refluxed for one hour. After cooling, the mixture was diluted with ice water and the dense colorless solid which had formed was filtered. Acidification of the filtrate deposited a small quantity of benzoguanide. The solid (calcium salt of benzoguanide) was slurried with dilute acetic acid and the resulting product filtered, thoroughly washed with dilute acetic acid and water, and water, and dried in an oven at 110° C. The yield of benzoguanide was 7.7 parts by weight or 82% of the theoretical. The product decomposed on heating at 322° C.

EXAMPLE 7

*Benzoguanide*

To a mixture of 10.3 parts by weight of benzoyl-guanylurea and 250 parts by weight of water was added 0.12 part by weight of NaOH. The mixture was heated to refluxing temperatures for 10 minutes after which time 93 parts by weight of Cellosolve was added. Complete solution did not occur at any time. The mixture was then refluxed for one hour. Ice was added, the solid filtered and dried in an oven at 110° C. The dried benzoguanide decomposed on heating at 321° C. and was obtained in a 44.7% yield.

EXAMPLE 8

*Caproguanide*

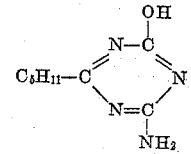

172 parts by weight of caproyl-dicyandiamide, 105 parts by weight of concentrated HCl and 250 parts by weight of water was heated under a refluxing condenser until the materials had completely dissolved and then for 10 minutes longer. Upon cooling, a thick cake of caproyl-guanylurea hydrochloride crystals was obtained. This material was treated with a solution of 105 parts by weight of NaOH in 300 parts of water. The resulting clear solution was heated to near boiling and then cooled in an ice bath. Upon acidification with acetic acid a colorless solid precipitated which was filtered, washed with water and allowed to dry. The product, caproguanide, was obtained in an 88% yield. The crude product was dissolved in 50% alcohol and recrystallized to give beautiful colorless flakes which decomposed when heated at 240–241° C. Chemical analysis checked closely with the theoretical values for caproguanide.

Example 9

*Lauroguanide*

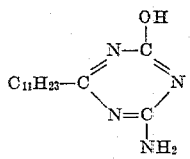

To a solution of 16 parts by weight of 95% NaOH in 500 parts by weight of water was added 100 parts by weight of lauroyl-guanylurea. After heating the mixture to boiling a clear solution resulted. Heating was then continued for several minutes at refluxing temperature and the solution cooled and acidified with acetic acid. The colorless solid was cooled, filtered, washed with water and allowed to dry at 70° C. Recrystallization of the material from Cellosolve (the ethyl ether of ethylene glycol) gave beautiful plates of lauroguanide which decomposed when heated to 229–230° C.

Example 10

*p-Nitrobenzoguanide*

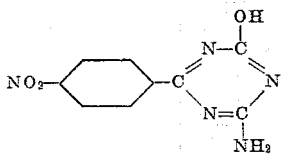

A portion of p-nitrobenzoyl-guanylurea was dissolved in water by treatment with caustic soda until the solution had a pH in excess of about 8.0. After allowing the solution to stand at room temperature for one and one-half hours a white crystalline material precipitated out. The excess alkali in the solution was then neutralized with hydrochloric acid and the precipitate recovered. The crude product, p-nitrobenzoguanide, was recrystallized by dissolving in hot glacial acetic acid followed by cooling, neutralization and filtration. The purified material decomposed when heated above 300° C.

Example 11

*o-Carboxybenzoguanide*

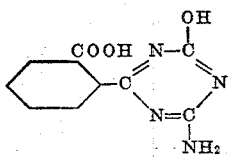

o-Carboxybenzoyl-guanylurea was dissolved in water and the solution made alkaline with caustic soda to a pH of about 8.0. After standing for about one hour at room temperature the solution was then neutralized and acidified with hydrochloric acid to a pH of 3.0. The resulting crystals of o-carboxybenzoguanide were then recrystallized from hot water in which the material was only slightly soluble. On heating the purified material it was found to decompose at 295° C. Chemical analysis of the product showed that it contained 23.98% nitrogen which compared favorably with a value of 24.13% nitrogen calculated for o-carboxybenzoguanide.

Example 12

*p-Aminobenzoguanide*

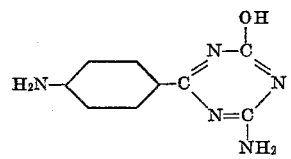

35 parts by weight of p-aminobenzoyl-guanylurea was dissolved in 200 parts by weight of a 5% solution of sodium hydroxide and allowed to stand for 75 minutes. Upon neutralization of the solution with dilute hydrochloric acid, p-aminobenzoguanide was precipitated. The white flocculent material was slightly soluble in hot water and after one recrystallization from water, sintered without completely melting on heating to 320–325° C.

Example 13

*m-Hydroxyphenoxyacetoguanide*

An alkaline solution of 20 parts by weight of m-hydroxyphenoxyacetyl-guanylurea was allowed to stand in a 3% solution of sodium hydroxide at room temperature for one-half hour. The solution was then carefully neutralized with dilute acetic acid and m-hydroxyphenoxyacetoguanide was obtained as a flocculent white precipitate. The product was slightly soluble in hot water and a recrystallized portion of the compound decomposed at 235–240° C.

Example 14

*Tetramethylene-diguanide*

25 parts by weight of adipyl-diguanylurea was dissolved in a 4% solution of caustic soda and after the solution had stood at room temperature for about one hour it was neutralized with dilute acetic acid. A precipitate of very finely divided white tetramethylene-diguanide was obtained.

The product did not melt when heated to a temperature of 320° C.

EXAMPLE 15

*p-Hydroxybenzoguanide*

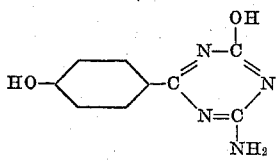

75 parts by weight of p-hydroxybenzoyl-guanylurea was dissolved in a 5% solution of caustic soda and allowed to stand at room temperature until a test portion of the solution no longer gave a violet color with an alkaline copper sulfate solution. After allowing the solution to stand for 15 minutes longer the clear solution was brought to neutrality with dilute sulfuric acid whereupon a slightly yellow amorphous precipitate of p-hydroxybenzoguanide was obtained. The product was recovered by filtration and when heated did not decompose or darken at a temperature of 326° C.

EXAMPLE 16

*Naphthenoguanide*

A flask containing a mixture of 32.2 parts by weight of naphthenylguanylurea (derived from monobasic naphthenic acids whose average neutralization equivalent was 238), 4.6 parts by weight of 97% sodium hydroxide, 15.0 parts by weight of water and 23 parts by weight of Cellosolve was heated over a free flame until complete solution occurred. The hot solution was filtered to remove a small quantity of dirt, cooled and acidified with excess acetic acid. The amorphous precipitate was filtered and washed well with water. After drying in an oven at 105° C., the colorless solid obtained represented 90.1% of the theoretical.

We claim:

1. A process of preparing aromatic substituted guanides which comprises mixing together in a mutual solvent an aromatic acyl guanylurea having the general formula

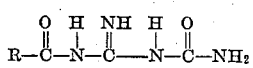

in which R is an aromatic radical with at least one equivalent of an alkaline material having a dissociation constant of at least $1 \times 10^{-6}$, allowing substantial conversion of the resulting guanylurea salt to guanide salt to take place, neutralizing the said guanide salt with an acid and recovering an aromatic substituted guanide having the formula

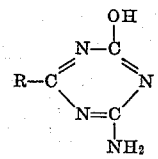

2. A process of preparing aromatic substituted guanides which comprises mixing together in a mutual solvent an aromatic acyl guanylurea having the general formula

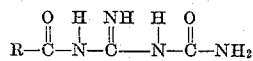

in which R is an aromatic radical with at least one equivalent of an alkali metal hydroxide, allowing substantial conversion of the resulting guanylurea salt to guanide salt to take place, neutralizing the said guanide salt with an acid and recovering an aromatic substituted guanide having the formula

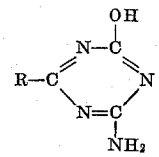

3. A process of preparing benzoguanide which comprises mixing together in a mutual solvent benzoyl guanylurea with at least one equivalent of an alkaline material having a dissociation constant of at least $1 \times 10^{-6}$, allowing substantial conversion of the resulting benzoyl guanylurea salt to the corresponding benzoyl guanide salt to take place, neutralizing the said benzoyl guanide salt with an acid and recovering the resulting benzoguanide.

DONALD W. KAISER.
JACK T. THURSTON.

REFERENCES CITED

The following references are of record in the file of this patent:

UNITED STATES PATENTS

| Number | Name | Date |
|---|---|---|
| 2,273,687 | Bock | Feb. 17, 1942 |

FOREIGN PATENTS

| Number | Country | Date |
|---|---|---|
| 540,651 | British | Oct. 24, 1941 |

OTHER REFERENCES

Beilstein, 4th ed., vol. III, p. 94. (Copy in Div. 6.)